United States Patent Office 2,824,097
Patented Feb. 18, 1958

2,824,097

IMPROVING THE COLOR OF DICARBOXYLIC ACID ESTERS OF CELLULOSE

Carl J. Malm, and Carlton L. Crane, Rochester, N. Y., assignors to Eastman Kodak Company, Rochester, N. Y., a corporation of New Jersey No Drawing. Application August 26, 1955
Serial No. 530,903

3 Claims. (Cl. 260—225)

This invention relates to improvement of the color of dicarboxylic acid esters of cellulose by treating with alkali metal permanganate without any detrimental effect thereon.

Methods have been previously suggested for improving the color of cellulose esters but those methods have often been characterized by auxiliary effects such as reduction of the viscosity of the cellulose, decrease in acyl content or lowering of the stability of those esters. Cellulose esters previously have been prepared with potassium permanganate but the effect obtained was to reduce the viscosity and to form an oxidized cellulose ester from the product thus treated.

In the manufacture of cellulose esters such as cellulose acetate phthalate by the process described and claimed in U. S. Patent No. 2,759,925, dated August 21, 1956 of Hiatt, Mench and Emerson, the products obtained often, when dissolved in organic solvents such as acetone, have exhibited poor color. In some uses to which these esters are put this color effect has been undesirable.

One object of our invention is to provide a process which reduces the color of dicarboxylic acid esters of cellulose which process does not have any derogatory effect on the cellulose esters. Another object of our invention is to provide a procedure for bleaching dicarboxylic acid esters of cellulose using alkali metal permanganate. Another object of our invention is to improve the color of dicarboxylic acid esters of cellulose by a method which is inexpensive and simple to employ. Other objects of our invention will appear herein.

We have found that cellulose acetate phthalate or like esters, particularly if they have been prepared by a process in which acetic acid solvent and sodium acetate catalyst have been used, are apreciably lightened in color by the treatment of the ester with a dilute solution of an alkali metal permanganate followed by treatment with a reducing acid such as aqueous $SO_2$ or sulfurous acid to easily remove manganese from the final product which results. The cellulose acetate phthalate or other ester is first treated by a dilute aqueous solution of alkali metal permanganate until that material takes on a uniform brown color. The product is then treated with a reducing acid such as by bubbling $SO_2$ gas into the mass for a time and the cellulose ester slowly becomes completely white. The alkali metal permanganate can be employed in concentrations of up to 1% because much above this figure the desired discharge of color may not be obtained. The minimum concentration of potassium permanganate solution employed depends upon the amount of color in the product and the level of color which is desired in the final product. If a product of good whiteness is desired the concentration of potassium permanganate used should be within the range of .05–1%. In the treatment with sulfurous acid or $SO_2$ the amount of that material used should be sufficient to impart whiteness to the product such as by bubbling in $SO_2$ until the desired degree of whiteness is obtained.

Our invention is useful for any of the dicarboxylic acid esters of cellulose, the making of which is described in U. S. Patent No. 2,759,925, dated August 21, 1956, of Hiatt, Mench and Emerson. The product after its preparation and washing is first treated with an aqueous solution of water-soluble permanganate which may be the potassium, sodium, ammonium salt or the like, until the cellulose ester treated takes on a uniform brown color. When the cellulose ester has been treated for a sufficient time to impart that color, treatment with a reducing acid discharges the brown color of the cellulose ester and upon washing with water and drying a cellulose ester is obtained which not only has good color but retains the other desirable characteristics of esters which are prepared in a phthalylation process as referred to above. The esters thus obtained are useful for the preparation of products which are useful in any connection in which those esters have previously been considered as suitable and particularly for uses in which a high degree of clarity or whiteness is desirable. The following examples illustrate the improvement in color in cellulose acetate phthalates prepared in accordance with our invention as described as distinguished from those which have not been given the prescribed treatment.

*Example 1*

120 parts of glacial acetic acid was added to a sigma-bladed mixer and cooled to 80° F. whereupon there was added thereto 72 parts of phthalic anhydride and 32 parts of anhydrous sodium acetate. The mass was then cooled to 80° F. There was then added while continuing the mixing 60 parts of cellulose acetate having 33% acetyl and the mass was heated to 180° F. A viscous solution was formed which was kept at 180° F. for 6 hours. The mass was cooled and 340 parts of distilled water having a temperature of 35–40° F. was added. The mixing was continued and a uniform precipitate of cellulose acetate phthalate was obtained. The precipitate was separated from the liquid and 200 parts of distilled water was mixed with the precipitate in the mixer. Also added was 100 parts of distilled water containing 3.1 parts of 94% $H_2SO_4$. The cellulose ester was drained and washed with 130° F. distilled water until the free phthalic acid content of the mass was reduced to 2% or less. Then a sample A was removed and the rest of the product B was covered with 340 parts of distilled water containing 0.22 part of $KMnO_4$, stirring was continued until the material became a uniform brown color, $SO_2$ gas was then passed into the slurry until complete whiteness was obtained. The product was drained, washed in 3 changes of distilled water and dried. The relative properties of the two products obtained were as follows:

| Combined Phthalyl | Visc. 15% Conc. in Acetone at 25° C., cps. | 15% acetone soln. | |
|---|---|---|---|
| | | Haze, p. p. m. | Color, p. p. m. |
| A. 31.0% | 113 | 30 | 800 |
| B. 31.0% | 111 | 30 | 400 |

*Example 2*

A cellulose acetate phthalate prepared, precipitated and washed as described in Example 1 was mixed with 350 parts of 130° F. distilled water containing 0.22 part of potassium permanganate and 6.25 parts of acetic acid in 40 parts of 130° F. distilled water was also stirred into the mass until the cellulose ester had a uniform brown color. $SO_2$ gas was then passed into the slurry until the product was completely white. The ester so obtained was washed in 3 successive changes of 130° F.

distilled water and dried. A product having 200 p. p. m. color in a 15% acetone solution was obtained.

*Example 3*

A cellulose acetate phthalate prepared and precipitated as described in Example 1 was washed in 5 successive changes of 130° F. distilled water. Two parts of the washed product containing 41.3% of moisture was mixed with 4 parts of 130° F. distilled water containing 0.0025 part of potassium permanganate. The stirring was continued until the product had a uniform brown color. $SO_2$ gas was then passed into the mass until the product became completely white. It was then washed in 17 successive changes of distilled water at 130° F. and dried. The product obtained had 300 p. p. m. color in a 15% acetone solution.

The products resulting from the treatment in accordance with our invention have good properties and may be employed in many of the uses heretofore listed for dicarboxylic acid esters of cellulose such as backing layers in photographic film, enteric coatings for pharmaceutical products and the like.

The haze and color values given above were determined by the methods described in U. S. Patent No. 2,652,34, column 4, line 60 to line 10, column 5.

We claim:

1. A method of improving the color of a cellulose ester having only lower fatty acid radicals and dicarboxylic acid radicals which comprises treating the cellulose ester in water susceptible form with an aqueous solution of a water soluble permanganate of .05–1% concentration to impart a uniform brown color to the cellulose ester and subsequently treating the wet cellulose ester with an aqueous solution of a reducing acid whereby the product obtained exhibits a considerably improved color when dissolved in organic solvent over that which it previously had.

2. A method of improving the color of a cellulose ester having only acetyl and phthalyl radicals which comprises treating the cellulose ester in water susceptible form with an aqueous solution of a water soluble permanganate of .05–1% concentration until the ester acquires a uniform brown color and subsequently treating the wet cellulose ester with sulfurous acid whereby a cellulose ester is obtained having a considerably improved color over that which it previously had.

3. In the method of preparing a cellulose ester having as substituents on the cellulose only lower fatty acid radicals and dicarboxylic acid radicals which ester is prepared by esterifying a lower fatty acid ester of cellulose having free and esterifiable hydroxyl groups with a reaction bath essentially consisting of a dicarboxylic acid anhydride as the essential esterifying reagent therein, a lower fatty acid as the solvent and a basic salt as the catalyst, which cellulose ester is precipitated and washed, the steps which comprise treating the precipitated cellulose ester with an aqueous solution of an alkali metal permanganate of .05–1 percent concentration to impart a uniform brown color thereto followed by treating the wet cellulose ester with sulfurous acid whereby the product obtained has good color characteristics.

References Cited in the file of this patent

UNITED STATES PATENTS

| | | |
|---|---|---|
| 2,705,689 | Hewson | Apr. 5, 1955 |
| 2,713,075 | Doeringer et al. | July 12, 1955 |

U. S. DEPARTMENT OF COMMERCE
PATENT OFFICE
CERTIFICATE OF CORRECTION

Patent No. 2,824,097 February 18, 1958

Carl J. Malm et al.

It is hereby certified that error appears in the printed specification of the above numbered patent requiring correction and that the said Letters Patent should read as corrected below.

Column 3, line 26, for "2,652,34," read -- 2,652,340, --.

Signed and sealed this 15th day of April 1958.

(SEAL)
Attest:

KARL H. AXLINE
Attesting Officer

ROBERT C. WATSON
Commissioner of Patents